United States Patent
Inoue

(10) Patent No.: US 9,375,812 B2
(45) Date of Patent: Jun. 28, 2016

(54) WELDING CARRIAGE

(75) Inventor: Yoshihiro Inoue, Kanagawa (JP)

(73) Assignee: Kokuho Company Limited, Kanagawa (JP)

( * ) Notice: Subject to any disclaimer, the term of this patent is extended or adjusted under 35 U.S.C. 154(b) by 153 days.

(21) Appl. No.: 14/383,412

(22) PCT Filed: Apr. 10, 2012

(86) PCT No.: PCT/JP2012/059801
§ 371 (c)(1),
(2), (4) Date: Sep. 5, 2014

(87) PCT Pub. No.: WO2013/153621
PCT Pub. Date: Oct. 17, 2013

(65) Prior Publication Data
US 2015/0041446 A1 Feb. 12, 2015

(51) Int. Cl.
*B23K 9/10* (2006.01)
*B23K 9/12* (2006.01)
(Continued)

(52) U.S. Cl.
CPC .............. *B23K 37/0241* (2013.01); *B23K 9/02* (2013.01); *B23K 9/025* (2013.01); *B23K 9/0216* (2013.01);
(Continued)

(58) Field of Classification Search
CPC .............. B23K 37/02; B23K 37/0211; B23K 37/0241; B23K 37/0264; B23K 37/0282; B23K 37/0294; B23K 37/04–37/0408; B23K 37/0426–37/0461; B23K 9/02; B23K 9/0216; B23K 9/025; B23K 9/0256; B23K 9/12
USPC .................... 219/124.31, 136, 137 R, 137.31
See application file for complete search history.

(56) References Cited

U.S. PATENT DOCUMENTS

| | | | | |
|---|---|---|---|---|
| 4,010,346 A | * | 3/1977 | Cecil | B23K 37/02 219/124.34 |
| 4,538,047 A | * | 8/1985 | Nakano | B23K 9/12 219/124.34 |

(Continued)

FOREIGN PATENT DOCUMENTS

| | | |
|---|---|---|
| JP | 61701/1974 | 12/1975 |
| JP | 61702/1974 | 12/1975 |

(Continued)

OTHER PUBLICATIONS

International Search Report dated Jul. 2, 2012, for PCT/JP2012/059801.

(Continued)

*Primary Examiner* — Sang Y Paik
(74) *Attorney, Agent, or Firm* — Kinney & Lange, P.A.

(57) ABSTRACT

A welding carriage traveling with a welding torch mounted thereon includes: a carriage body; and a torch supporting part disposed between the front and rear ends of carriage body and supporting a tip of the welding torch in a state of positioning on a side surface side of the carriage body and facing diagonally downward. The torch supporting part includes a torch swinging unit and a weaving unit. The torch swinging unit includes a torch swinging mechanism which swings the tip of the welding torch in a forward and rearward direction of the carriage body, and thereby moves tip close to the welding line. The weaving unit includes a weaving mechanism which operates so as to integrally rotate a unit case and a torch mounting bar of the torch swinging unit about a screw, thereby to cause the welding torch to perform a weaving operation.

3 Claims, 4 Drawing Sheets

(51) Int. Cl.
*B23K 37/02* (2006.01)
*B23K 9/02* (2006.01)
*B23K 9/025* (2006.01)

(52) U.S. Cl.
CPC ............... *B23K 9/0256* (2013.01); *B23K 9/12* (2013.01); *B23K 37/02* (2013.01); *B23K 37/0211* (2013.01); *B23K 37/0264* (2013.01); *B23K 37/0282* (2013.01); *B23K 37/0294* (2013.01)

(56) References Cited

U.S. PATENT DOCUMENTS

| | | | | |
|---|---|---|---|---|
| 4,577,089 | A * | 3/1986 | Olson | B23K 7/102 219/124.22 |
| 4,675,502 | A * | 6/1987 | Haefner | B25J 9/1684 219/124.34 |
| 7,520,043 | B2 * | 4/2009 | Bon | B23K 9/032 219/121.14 |
| 7,525,276 | B2 * | 4/2009 | Eaton | B25J 5/007 280/763.1 |
| 2011/0210110 | A1 * | 9/2011 | Dearman | B23K 9/0206 219/137 R |

FOREIGN PATENT DOCUMENTS

| | | |
|---|---|---|
| JP | 49333/1985 | 10/1986 |
| JP | 61-279367 A | 12/1986 |
| JP | 198241/1985 | 7/1987 |
| JP | 102463/1987 | 1/1989 |
| JP | 14477/1992 | 8/1993 |
| JP | 7-266042 A | 10/1995 |
| JP | 9-1336 A | 1/1997 |
| JP | 2009-248128 | 10/2009 |

OTHER PUBLICATIONS

Written Opinion dated Jul. 10, 2012, for PCT/JP2012/059801.

* cited by examiner

WELDING CARRIAGE

TECHNICAL FIELD

The present invention relates to a welding carriage traveling with a welding torch mounted thereon and capable of automatic welding, and more particularly to a welding carriage suitable for fillet welding of a corner portion.

BACKGROUND ART

Conventional examples of the welding carriage suitable for fillet welding of a corner portion as described above include a welding carriage disclosed in Patent Document 1. The welding carriage relates to the invention filed by the present applicant.

More specifically, the welding carriage includes a carriage body having four running wheels disposed on the front and rear ends thereof and a torch supporting part disposed between the front and rear ends of the carriage body. The welding torch is supported in an inclined state by the torch supporting part. More specifically, the welding torch is supported so as to position its tip on a side surface side of the carriage body and so as to face diagonally downward. The torch supporting part includes a torch driving mechanism which swings the tip of the welding torch in a forward and rearward direction of the carriage body, and simultaneously positions the tip close to a welding line along the forward and rearward direction thereof.

In the welding carriage, for example, in a case of performing fillet welding on inside corners, at a stage when a wall blocks the carriage body from moving forward, the torch driving mechanism of the torch supporting part swings the tip of the welding torch in front of the carriage body, whereby the welding carriage can weld up to the corner portions without so-called unwelded portions.

During this period, the torch driving mechanism of the torch supporting part moves the welding torch toward the welding line, and thus the tip of the welding torch swung forward is positioned close to the welding line, resulting in surely providing a gas shield, and thus maintaining weld quality.

PRIOR ART DOCUMENT

Patent Document

Patent Document 1: Japanese Patent Laid-Open No. 2009-248128

SUMMARY OF THE INVENTION

Problems to be Solved by the Invention

Here, in a case of vertical position fillet welding (fillet welding in a vertical position), in order to prevent molten metal from sagging, the welding torch is required to perform a weaving operation. Note that in the case of vertical position fillet welding, the welding carriage travels upward by sucking the wall surface with a strong magnet mounted on the carriage body and thus is inevitably subject to weight restrictions.

In short, the above conventional welding carriage has a problem in that, for example, in a case of performing fillet welding on inside corners, the welding carriage can weld up to corner portions without unwelded portions while maintaining weld quality, but cannot cope with vertical position fillet welding. This problem remains as a problem to be solved in the prior art.

In view of the above conventional problem, the present invention has been made, and an object of the present invention is to provide a welding carriage which, in addition to suppressing an increase in weight to a minimum, for example, in a case of performing fillet welding on inside corners in a vertical position, not only can weld up to the corner portions without unwelded portions while maintaining weld quality, but also prevent molten metal from sagging.

Means for Solving the Problems

In order to achieve the above object, an aspect of the present invention is directed to a welding carriage traveling with a welding torch mounted thereon, the welding carriage including: a carriage body; and a torch supporting part disposed between front and rear ends of the carriage body and supporting the welding torch in a state of positioning a tip of the welding torch on a side surface side of the carriage body and facing diagonally downward, the torch supporting part including: a base plate disposed on the carriage body so as to be movable in vertical and horizontal directions; a torch swinging unit; and a weaving unit, the torch swinging unit including: a unit case supported by the base plate; a swing motor attached to the unit case; a torch mounting bar one end portion of which is housed in the unit case and the other end portion of which is formed as a mounting portion of the welding torch; and a torch swinging mechanism housed in the unit case, wherein the torch swinging mechanism operates so as to cause rotation output of the swing motor to swing the tip of the welding torch mounted on the torch mounting bar in a forward and rearward direction of the carriage body, and simultaneously so as to position the tip close to a welding line along the forward and rearward direction of the carriage body, wherein the weaving unit includes: a weaving motor fixed to the base plate; and a weaving mechanism, wherein the weaving mechanism operates so as to integrally rotate the unit case and the torch mounting bar of the torch swinging unit about a forward and backward shaft of the carriage body by rotation output of the weaving motor, thereby to cause the tip of the welding torch mounted on the torch mounting bar to perform a weaving operation.

Preferably, the torch swinging mechanism of the torch swinging unit, in the unit case, includes: a moving pin for performing a reciprocating circular motion by rotation output of the swing motor; a fixed pin disposed in the unit case; an operation hole formed in an end portion of the torch mounting bar and fitted in the moving pin; and an elongated hole formed closer to the other end portion of the torch mounting bar than the operation hole in the end portion of the torch mounting bar and fitted in the fixed pin, wherein the torch swinging mechanism causes rotation output of the swing motor to cause the reciprocating circular motion of the moving pin and the operation hole to allow relative movement of the fixed pin inside the elongated hole, thereby to swing the tip of the welding torch mounted on the torch mounting bar about the fixed pin and simultaneously to move the tip closer to and away from the welding line.

Preferably, the weaving mechanism of the weaving unit includes: a weaving elongated hole disposed along the forward and rearward direction of the carriage body on the unit case side of the torch swinging mechanism in the torch swinging unit; and an eccentric roller eccentrically rotating inside the weaving elongated hole by output of the weaving motor, wherein the weaving mechanism causes output of the weaving motor to cause eccentric rotation of the eccentric roller inside the weaving elongated hole, thereby to integrally rotate the unit case and the torch mounting bar about a forward and backward shaft of the carriage body, and thereby to cause the welding torch mounted on the torch mounting bar to perform a weaving operation.

In the welding carriage of the present invention, for example, in a case of performing fillet welding on inside corners in a vertical position, at a stage when a wall blocks the carriage body from moving upward, the torch swinging mechanism in the torch swinging unit on the torch supporting part swings the tip of the welding torch in a traveling direction of the carriage body, whereby the welding carriage can weld up to corner portions without so-called unwelded portions.

During this period, the torch swinging mechanism in the torch swinging unit on the torch supporting part moves the welding torch toward the welding line, and thus the tip of the welding torch swung in the travelling direction is positioned close to the welding line, resulting in surely providing a gas shield, and thus maintaining weld quality.

In addition, in the fillet welding, the weaving mechanism of the weaving unit integrally rotates the unit case and the torch mounting bar of the torch swinging unit about a forward and backward shaft of the carriage body, thereby to cause the tip of the welding torch to perform a weaving operation, thus preventing molten metal from sagging.

At this time, the torch swinging mechanism in the torch swinging unit on the torch supporting part is housed in the unit case; and the unit case housing the torch swinging mechanism rotates integrally with the torch mounting bar about a forward and backward shaft of the carriage body by the weaving mechanism of the weaving unit. In other words, a function of eliminating unwelded portions and a weaving function are combined in a compact housing, thus suppressing an increase in weight to a minimum.

Advantageous Effects of the Invention

In the welding carriage of the present invention, while suppressing an increase in weight to a minimum, for example, in a case of performing fillet welding on inside corners in a vertical position, the welding carriage exhibits very excellent effects such as capable of not only welding up to corner portions without unwelded portions while maintaining weld quality, but also preventing molten metal from sagging.

In addition, in the welding carriage of the present invention, at a stage when the tip of the welding torch is swung in the forward and rearward direction of the carriage body, the welding carriage not only can position the tip of the welding torch close to the welding line along the forward and rearward direction of the carriage body without complicating the structure, but also can cause the tip of the welding torch to perform a weaving operation without complicating the structure.

MODE FOR CARRYING OUT THE INVENTION

Hereinafter, the present invention will be described with reference to the accompanying drawings.

FIGS. 1 to 4 illustrate a welding carriage according to an embodiment of the present invention.

Figure 1:
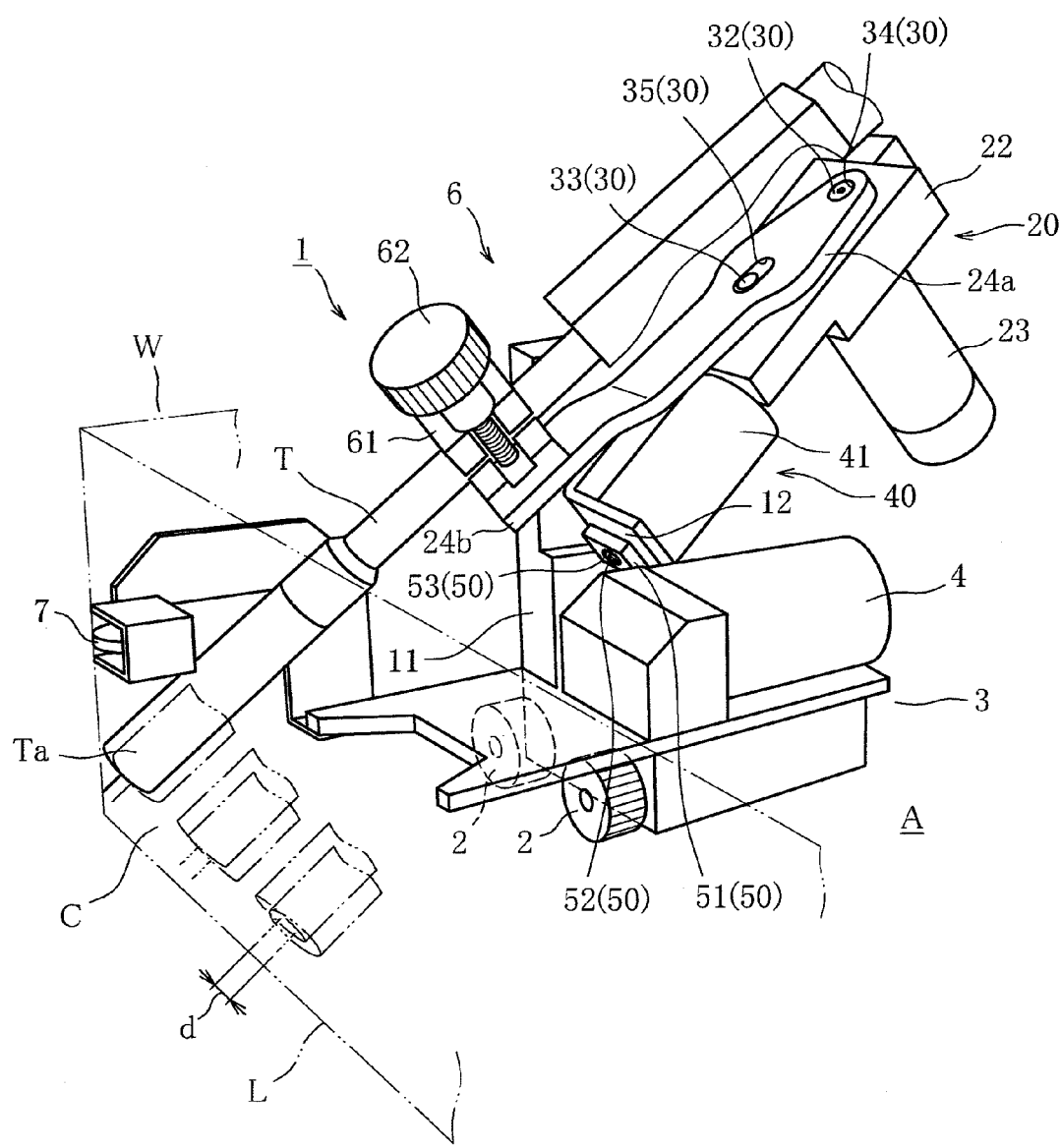
FIG. 1 is an overall perspective explanatory view of a welding carriage according to an embodiment of the present invention.

As illustrated in FIG. 1, a welding carriage 1 includes a carriage body 3 having four running wheels 2; a speed reducer motor 4 mounted on the carriage body 3; an unillustrated driving force transmission mechanism transmitting a driving force supplied from the speed reducer motor 4 to the four running wheels 2; a torch supporting part 6 disposed between the front and rear ends of the carriage body 3 and supporting a welding torch T in a state of positioning a tip Ta of the welding torch T on one side surface side (on the left side in FIG. 1) of the carriage body 3 and facing diagonally downward; and a pair of wall surface profiling rollers 7 (only one of the pair is illustrated in FIG. 1) disposed to extend on the one side surface side on which the tip Ta of the welding torch T of the carriage body 3 is protruded, wherein an unillustrated magnet is fixed to inside the carriage body 3 thereby to attach the carriage body 3 to a running surface A.

Figure 2:
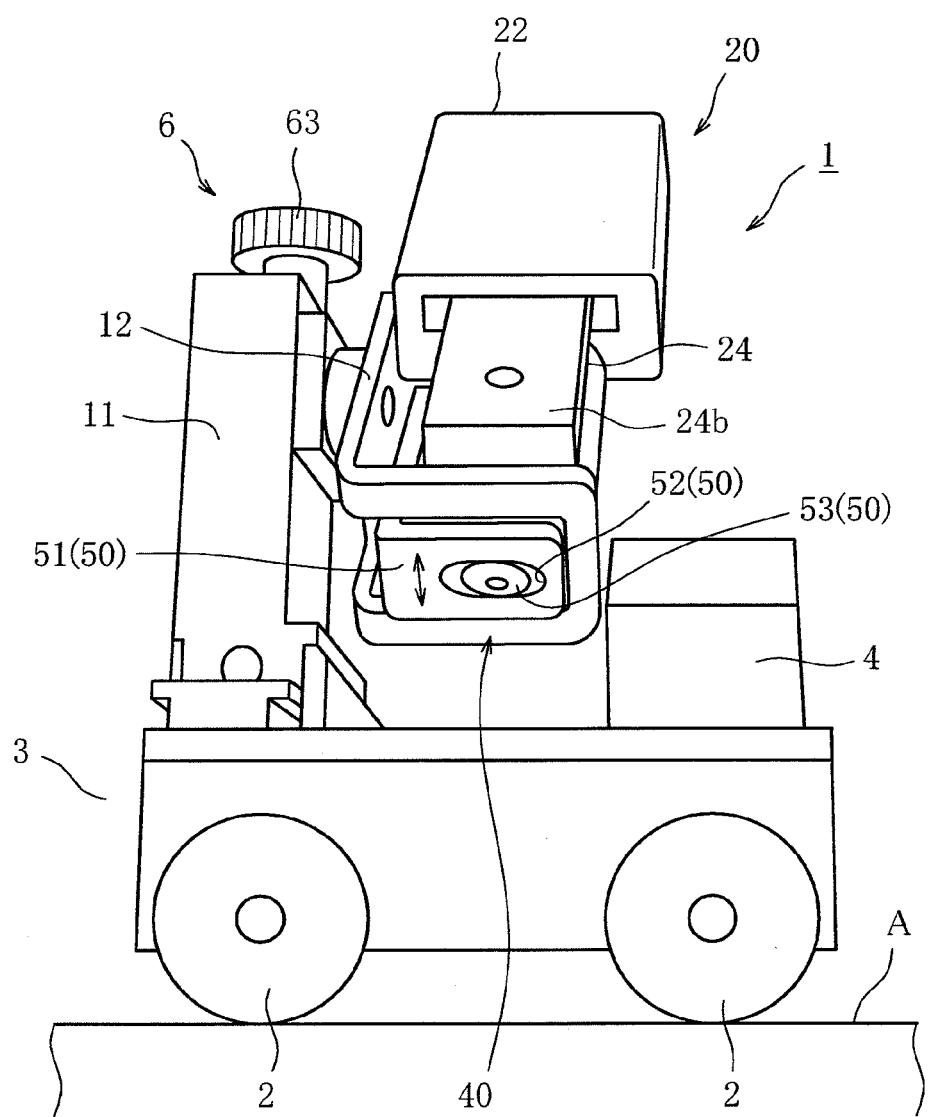
FIG. 2 is a side explanatory view of the welding carriage illustrated in FIG. 1.
Figure 3:
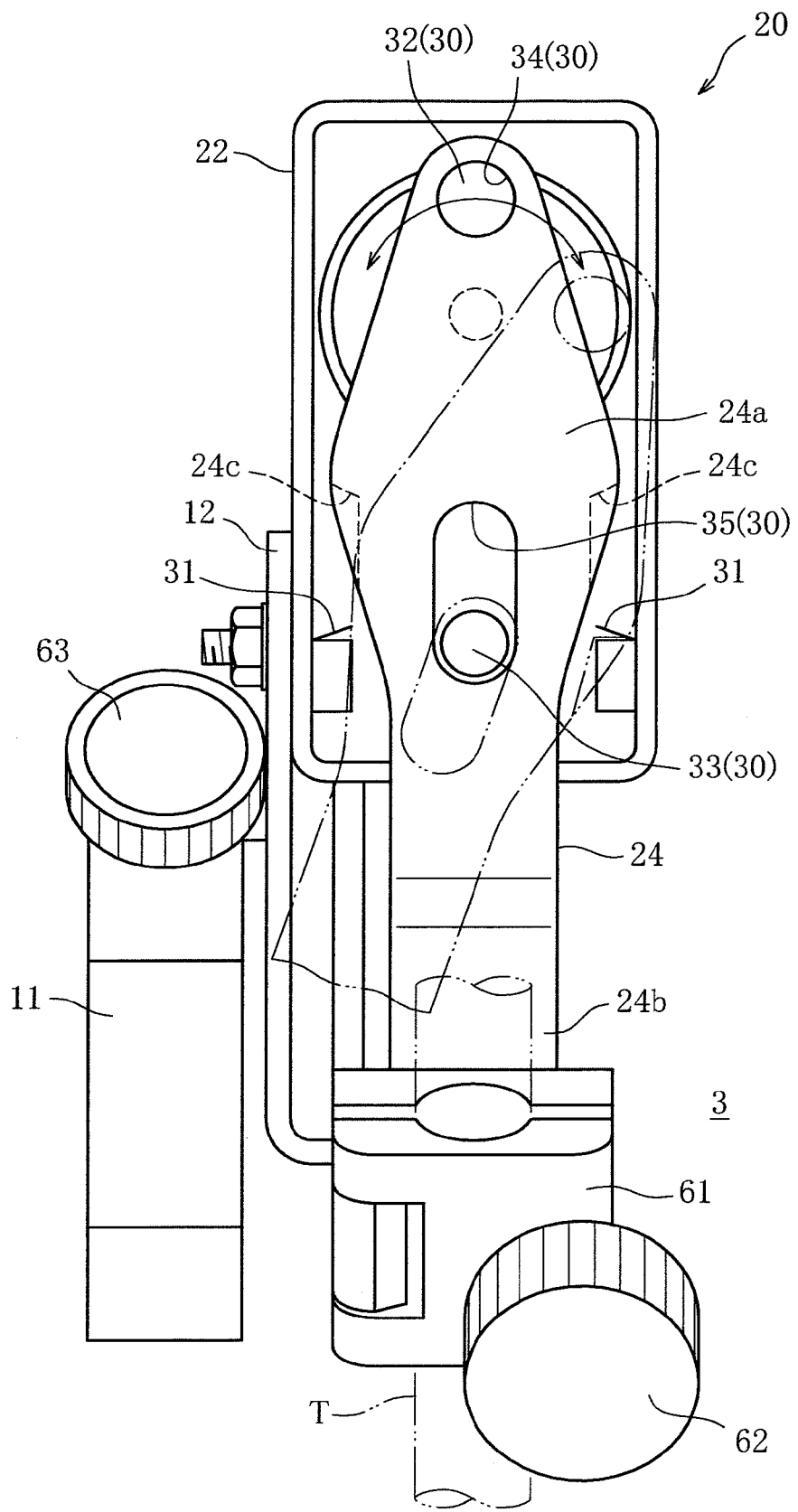
FIG. 3 is a plan explanatory view of a torch swinging unit portion in the welding carriage illustrated in FIG. 1.
Figure 4:
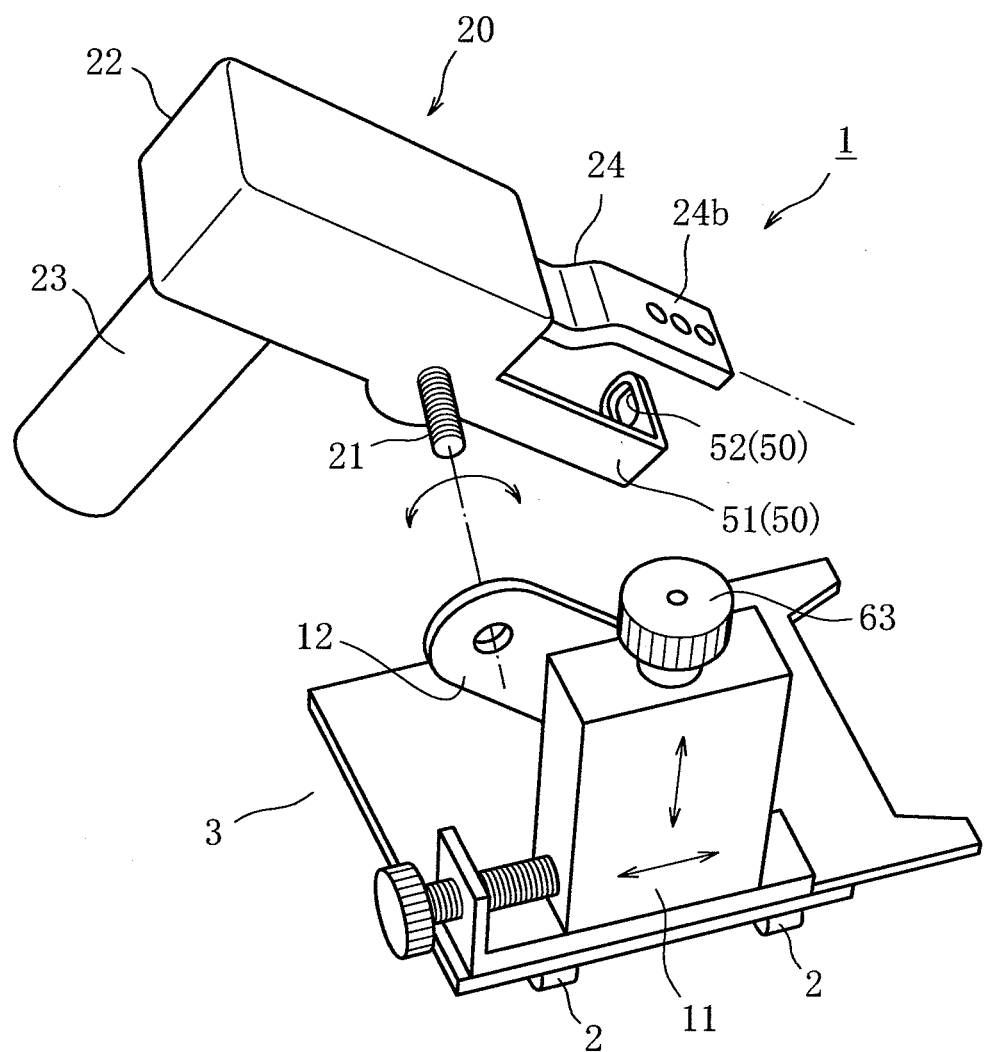
FIG. 4 is a perspective explanatory view in a state in which the torch swinging unit portion of the welding carriage illustrated in FIG. 1 is removed from the carriage body.

In this case, as illustrated in FIGS. 2 to 4, the torch supporting part 6 includes: a block 11 disposed to be slidable in left and right directions with respect to the carriage body 3; a base plate 12 disposed to be movable in upward and downward directions with respect to the block 11; a torch swinging unit 20; and a weaving unit 40.

As illustrated in FIGS. 3 and 4, the torch swinging unit 20 includes: a unit case 22 supported on the base plate 12 through a screw 21 along the forward and rearward direction of the carriage body 3 and rotatable about the screw 21; a swing motor 23 attached to the unit case 22; a torch mounting bar 24 one end portion 24a of which is housed in the unit case 22 and the other end portion 24b of which is formed as a mounting portion of the welding torch T; and a torch swinging mechanism 30 housed in the unit case 22.

The torch swinging mechanism 30 includes: a moving pin 32 performing a reciprocating circular motion by rotation output of the swing motor 23 inside the unit case 22; a fixed pin 33 disposed in the unit case 22; an operation hole 34 formed in the one end portion 24a of the torch mounting bar 24 and fitted in the moving pin 32; and an elongated hole 35 formed closer to the other end portion 24b than the operation hole 34 in the one end portion 24a of the torch mounting bar 24 and fitted in the fixed pin 33.

The torch swinging mechanism 30 is configured to cause rotation output of the swing motor 23 to cause the reciprocating circular motion of the moving pin 32 and the operation hole 34 to allow relative movement of the fixed pin 33 inside the elongated hole 35, thereby to swing the welding torch T mounted on the torch mounting bar 24 together with the torch mounting bar 24 about the fixed pin 33 and at the same time to move the tip Ta of the welding torch T closer to and away from the welding line L along the forward and rearward direction thereof.

Note that the swinging (rocking) motion of the torch mounting bar 24 by the reciprocating circular motion of the moving pin 32 and the operation hole 34 is switched when notches 24c and 24c formed in the torch mounting bar 24 come contact with a pair of limit switches 31 and 31 disposed in the unit case 22.

Meanwhile, the weaving unit 40 includes: a weaving motor 41 fixed to the base plate 12; and a weaving mechanism 50.

The weaving mechanism 50 includes: a transmission piece 51 integrally provided on the unit case 22 side of the torch swinging mechanism 30 in the torch swinging unit 20; a weaving elongated hole 52 formed in the transmission piece 51 along the forward and rearward direction of the carriage body 3; and an eccentric roller 53 eccentrically rotating inside the weaving elongated hole 52 by rotation output of the weaving motor 41.

The weaving mechanism 50 is configured to cause output of the weaving motor 41 to cause the eccentric rotation of the eccentric roller 53 inside the weaving elongated hole 52, thereby to integrally rotate the unit case 22 and the torch mounting bar 24 about the above screw 21 serving as a forward and backward shaft of the carriage body 3, and thereby to cause the welding torch T mounted on the torch mounting bar 24 to perform a weaving operation with a weaving width d.

Note that reference sign 61 in FIGS. 1 and 3 denotes a torch holder, and reference signs 62 and 63 in FIGS. 1 to 4 each denote an operation knob.

As described above, according to the welding carriage 1 of the present embodiment, for example, in a case of performing fillet welding on an inside corner C illustrated in FIG. 1, at a stage when a wall W blocks the carriage body 3 from moving forward, the torch swinging mechanism 30 in the torch swinging unit 20 on the torch supporting part 6 swings the tip Ta of the welding torch T in a traveling direction of the carriage body 3 so as to move from a state illustrated by a virtual line to a state illustrated by a solid line in FIG. 1, whereby the welding carriage can weld up to corner portions without so-called unwelded portions.

More specifically, at a stage when the wall W blocks the carriage body 3 from moving forward, the rotation output of the swing motor 23 of the torch swinging unit 20 causes the moving pin 32 and the operation hole 34 of the torch swinging mechanism 30 to perform a circular motion, and accordingly to relatively move the fixed pin 33 inside the elongated hole 35, thereby to swing the welding torch T mounted on the torch mounting bar 24 together with the torch mounting bar 24 about the fixed pin 33, whereby the welding carriage can weld up to corner portions without unwelded portions.

During this period, the relative movement of the elongated hole 35 and the fixed pin 33 caused by the circular motion of the moving pin 32 and the operation hole 34 in the torch swinging mechanism 30 causes the torch mounting bar 24, namely, the welding torch T to move toward the welding line L, and thus the tip Ta of the welding torch T swung in the travelling direction is positioned close to the welding line L, resulting in surely providing a gas shield, and thus maintaining weld quality.

In addition, the welding carriage 1 of the present embodiment includes the weaving unit 40. Therefore, the output of the weaving motor 41 of the weaving unit 40 causes the eccentric roller 53 of the weaving mechanism 50 to eccentrically rotate inside the weaving elongated hole 52, whereby the unit case 22 and the torch mounting bar 24 of the torch swinging unit 20 integrally rotate about the above screw 21 serving as a forward and backward shaft of the carriage body 3, thereby to cause the tip Ta of the welding torch T to perform a weaving operation, thus enabling multi-layer build-up welding.

By the welding carriage 1 of the present embodiment, for example, in a case of performing fillet welding on inside corners in a vertical position, like a case of performing fillet welding on inside corners in a horizontal position as described above, the welding carriage 1 not only can weld up to corner portions without unwelded portions while maintaining weld quality, but also can prevent molten metal from sagging because the weaving mechanism 50 of the weaving unit 40 causes the tip Ta of the welding torch T to perform a weaving operation.

At this time, the torch swinging mechanism 30 in the torch swinging unit 20 on the torch supporting part 6 is housed in the unit case 22; and further the unit case 22 housing torch swinging mechanism 30 rotates integrally with the torch mounting bar 24 about the above screw 21 serving as a forward and backward shaft of the carriage body 3 by the weaving mechanism 50 of the weaving unit 40. In other words, a function of eliminating unwelded portions and a weaving function are combined in a compact housing, thus suppressing an increase in weight to a minimum.

In addition, as described above, the welding carriage 1 of the present embodiment combines the function of eliminating unwelded portions and the weaving function in a compact housing. Thus, at a stage when the tip Ta of the welding torch T is swung in the traveling direction of the carriage body 3, the tip Ta of the welding torch T can be positioned close to the welding line L without complicating the structure, and further the tip Ta of the welding torch T can perform a weaving operation without complicating the structure.

The configuration of the welding carriage according to the present invention is not limited to the configuration of the above embodiment.

EXPLANATION OF REFERENCE SIGNS 1 welding carriage
3 carriage body
6 torch supporting part
12 base plate
20 torch swinging unit
21 screw (forward and backward shaft of carriage body)
22 unit case
23 swing motor
24 torch mounting bar
24a one end portion of torch mounting bar
24b other end portion of torch mounting bar
30 torch swinging mechanism
32 moving pin
33 fixed pin
34 operation hole
35 elongated hole
40 weaving unit
41 weaving motor
50 weaving mechanism
52 weaving elongated hole
53 eccentric roller
L welding line
T welding torch
Ta tip of welding torch

The invention claimed is:

1. A welding carriage traveling with a welding torch mounted thereon, the welding carriage comprising:
   a carriage body; and
   a torch supporting part disposed between front and rear ends of the carriage body and supporting the welding torch in a state of positioning a tip of the welding torch on a side surface side of the carriage body and facing diagonally downward,
   the torch supporting part comprising:
      a base plate disposed on the carriage body so as to be movable in vertical and horizontal directions;
      a torch swinging unit; and
      a weaving unit, the torch swinging unit comprising:
- a unit case supported by the base plate;
- a swing motor attached to the unit case;
- a torch mounting bar one end portion of which is housed in the unit case and the other end portion of which is formed as a mounting portion of the welding torch; and
- a torch swinging mechanism housed in the unit case, wherein
  the torch swinging mechanism is configured to operate so as to cause rotation output of the swing motor to swing the tip of the welding torch mounted on the torch mounting bar in a forward and rearward direction of the carriage body, and simultaneously so as to position the tip close to a welding line along the forward and rearward direction of the carriage body, and
the weaving unit comprises:
- a weaving motor fixed to the base plate; and
- a weaving mechanism, wherein
  the weaving mechanism is configured to operate so as to integrally rotate the unit case and the torch mounting bar of the torch swinging unit about a forward and backward shaft of the carriage body by rotation output of the weaving motor, thereby to cause the tip of the welding torch mounted on the torch mounting bar to perform a weaving operation.

2. The welding carriage according to claim 1, wherein the torch swinging mechanism of the torch swinging unit, in the unit case, comprises:
- a moving pin for performing a reciprocating circular motion by rotation output of the swing motor; and
- a fixed pin disposed in the unit case;
- wherein the torch mounting bar has an operation hole formed in an end portion thereof that is fitted in the moving pin and has an elongated hole formed closer to the other end portion thereof than the operation hole in the end portion thereof that is fitted in the fixed pin, and
- wherein the torch swinging mechanism is configured to cause rotation output of the swing motor to cause the reciprocating circular motion of the moving pin and the operation hole to allow relative movement of the fixed pin inside the elongated hole, thereby to swing the tip of the welding torch mounted on the torch mounting bar about the fixed pin and simultaneously to move the tip closer to and away from the welding line.

3. The welding carriage according to claim 1, wherein the weaving mechanism of the weaving unit comprises:
- a transmission piece on a unit case side of the torch swinging mechanism in the torch swinging unit, the transmission piece having a weaving elongated hole therein disposed along the forward and rearward direction of the carriage body; and
- an eccentric roller eccentrically rotating inside the weaving elongated hole by output of the weaving motor, wherein
  the weaving mechanism is configured to cause output of the weaving motor to cause eccentric rotation of the eccentric roller inside the weaving elongated hole, thereby to integrally rotate the unit case and the torch mounting bar about a forward and backward shaft of the carriage body, and thereby to cause the welding torch mounted on the torch mounting bar to perform a weaving operation.

\* \* \* \* \*